United States Patent [19]

Mar

[11] 4,173,849
[45] Nov. 13, 1979

[54] ELECTRIC HAND DRILL POWERED PORTABLE GRINDER

[76] Inventor: Sergio R. Mar, Mapimi #45, Mexico City, Mexico, 2

[21] Appl. No.: 852,941

[22] Filed: Nov. 18, 1977

[51] Int. Cl.² .............................................. B24B 9/00
[52] U.S. Cl. ...................... 51/98 R; 15/28;
51/166 TS; 83/574; 83/750; 144/1 R
[58] Field of Search ............ 51/5 R, 5 B, 72 R, 98 R,
51/166 TS, 166 FB, 241 R, 268; 15/23, 28;
408/241, 234; 83/574, 750; 144/1 R, 1 F, 1 E;
173/29, 46

[56] References Cited

U.S. PATENT DOCUMENTS

| 410,398 | 9/1889 | Bogardus | 144/1 R |
|---|---|---|---|
| 830,360 | 9/1906 | Paine | 51/268 X |
| 1,698,336 | 1/1929 | Klein | 51/241 R |
| 1,835,432 | 12/1931 | Samson | 83/574 X |
| 1,942,834 | 1/1934 | Railley | 144/1 R |
| 2,726,689 | 12/1955 | Busby | 144/1 E |
| 3,341,981 | 9/1967 | Baronyak | 51/241 R |
| 4,065,886 | 1/1978 | Harwood et al. | 51/166 FB |

FOREIGN PATENT DOCUMENTS 2025374 12/1971 Fed. Rep. of Germany ........... 408/234

*Primary Examiner*—Nicholas P. Godici
*Assistant Examiner*—Robert P. Olszewski
*Attorney, Agent, or Firm*—Ernest H. Schmidt

[57] ABSTRACT

A portable grinder utilizing a standard electric hand drill as a source of mechanical power has a support base structure upon the upper surface of which is journalled a drive spindle one end of which is adapted to receive, in driving engagement, the chuck of the hand drill, and the other end of which serves to drive a grinding wheel and other rotatively driven tools selectively attachable thereto. Adjustable means is provided for supporting an electric hand drill in rotary alignment with the drive spindle; and a cover member removably attachable to the base structure renders the assemblage fully portable.

6 Claims, 9 Drawing Figures

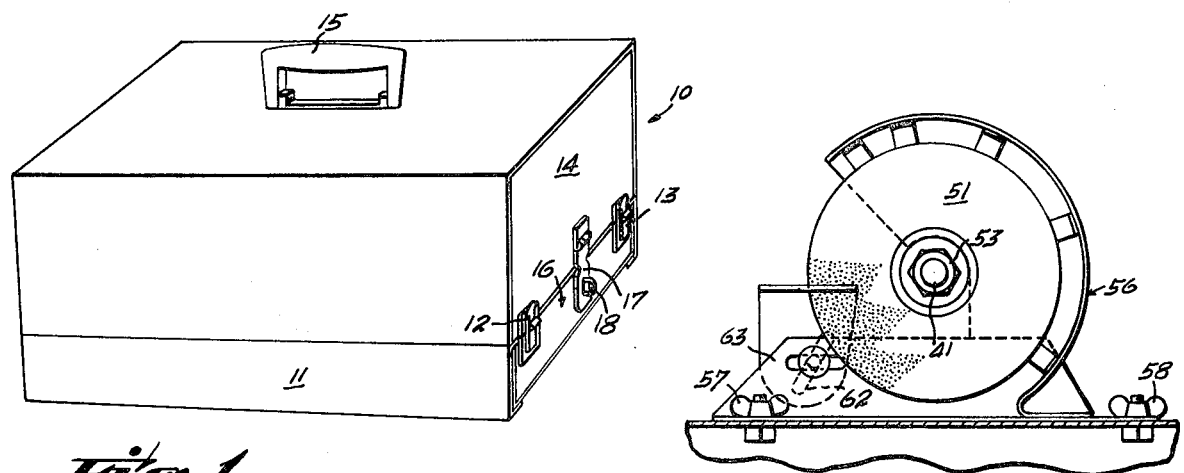
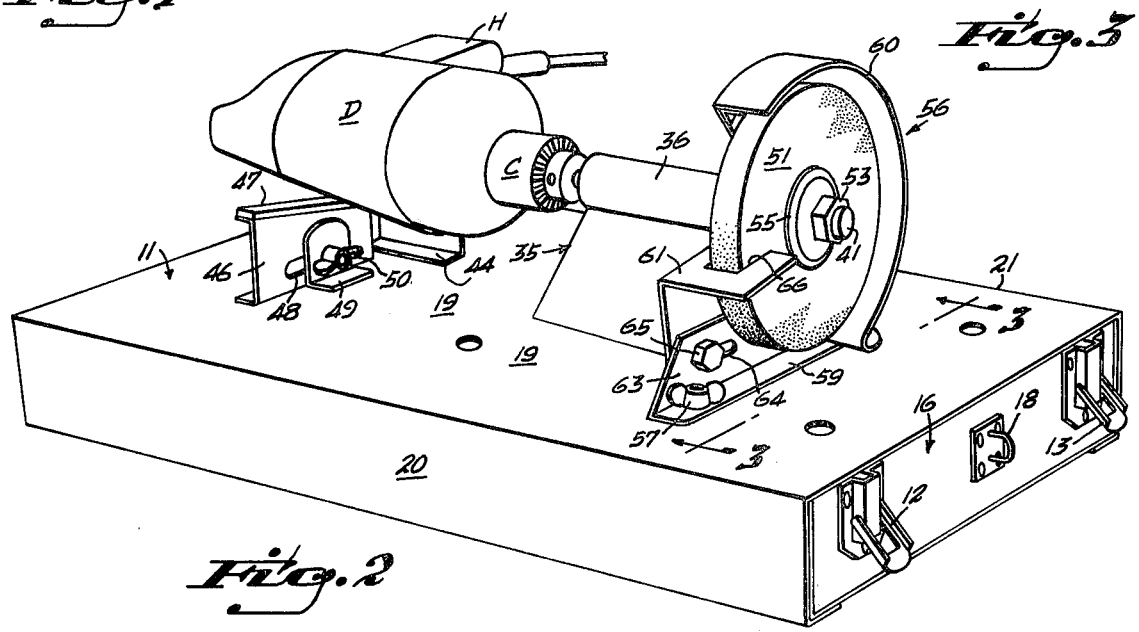
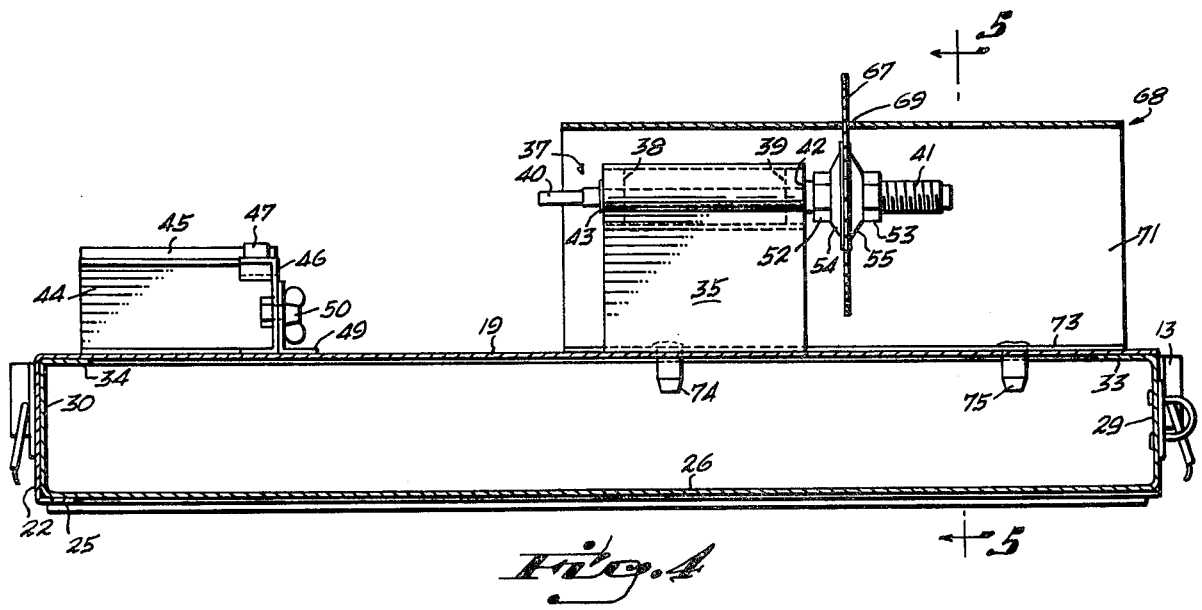

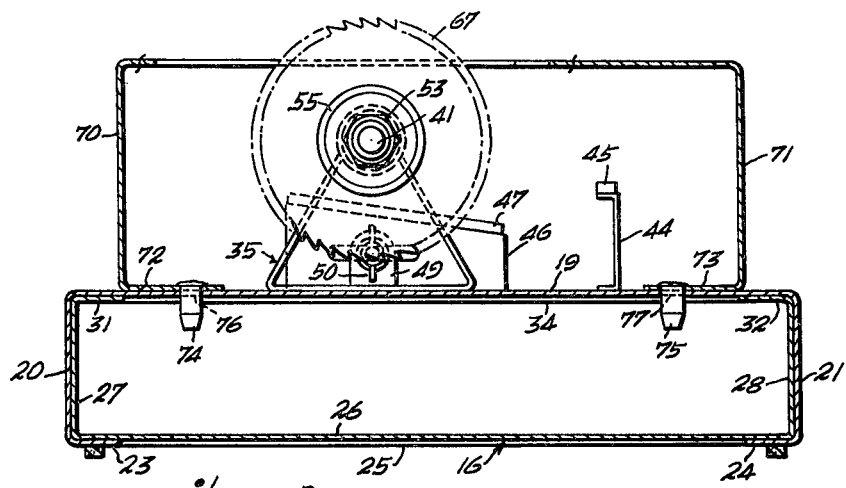
FIG. 5
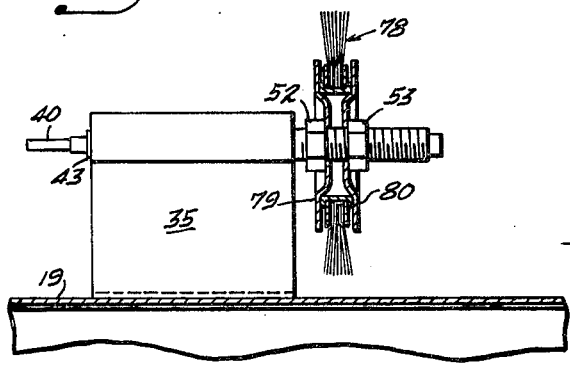
FIG. 6
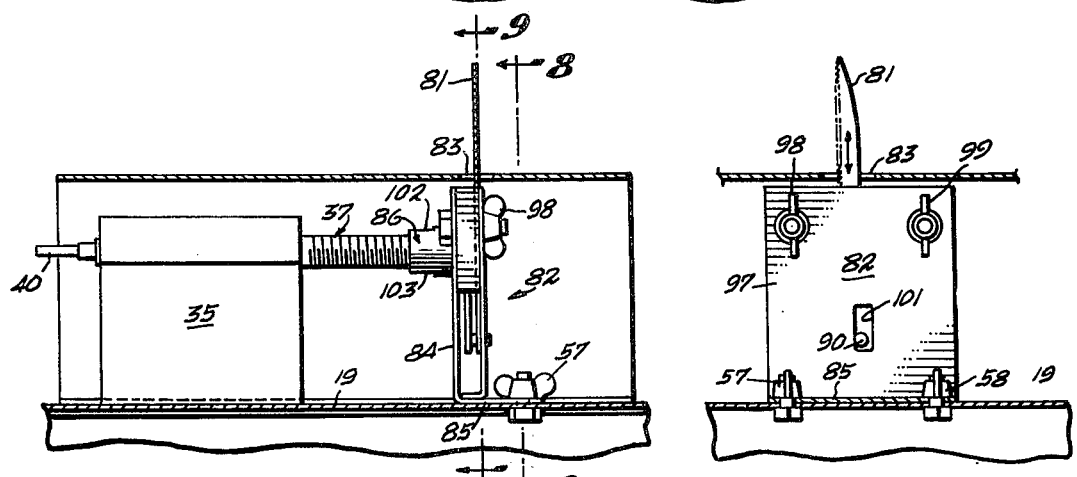
FIG. 7
FIG. 8
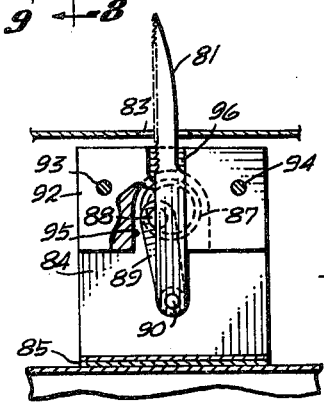
FIG. 9

4,173,849

ELECTRIC HAND DRILL POWERED PORTABLE GRINDER

This invention relates to rotary tools, and is directed particularly to a portable power grinder, rotary saw or the like that, lacking its own source of driving power, is adapted to connection with an ordinary electric hand drill for supplying the rotary power whenever the device is to be used.

The principal object of the invention is to provide a portable grinding machine which, because it uses an ordinary electric hand drill as a source of mechanical driving power, is of such simplicity, and so light in weight, as to be unusually compact and fully portable for ready storage when not in use.

A more particular object of the invention is to provide a portable grinding machine having a support base structure in spaced relation above which is journalled a drive spindle, one end of which is adapted for connection with the chuck of an ordinary electric hand drill, and the other end of which is adapted to drivingly interconnect, selectively, with a plurality of rotatively driven work tools.

Another object of the invention is to provide portable grinding machine of the above nature including means for adjustably supporting the electric hand drill in rotative alignment with the drive spindle.

Still another object of the invention is to provide a portable grinding machine of the above nature wherein the base support structure houses a sliding drawer within which the various rotatively driven attachment devices may be kept when not in use, and further including a cover member attachable to the base support structure for enclosing the entire assemblage when not in use.

Yet another object of the invention is to provide portable grinding machine of the character described which will be simple in structure, inexpensive to manufacture, readily adaptable to use with a wide variety of readily available portable electric hand drills as a source of power, and which will be compact, dependable in performance and durable in use.

Other objects, features and advantages of the invention will be apparent from the following description when read with reference to the accompanying drawings. In the drawings, wherein like reference numerals denote corresponding parts throughout several views:

FIG. 1 is a perspective view of the portable grinder enclosed within its carrying case;

FIG. 2 is a perspective view, seen from above and in an enlarged scale, of the portable grinder with the carrying case cover removed and showing an electric hand drill attached for driving the grinding wheel;

FIG. 3 is a partial, transverse cross-sectional view taken along the line 3—3 of FIG. 2 in the direction of the arrows and illustrating details of the grinding wheel guard and tool support mechanism;

FIG. 4 is a longitudinal cross-sectional view of the grinder support base, illustrating alternative use of a rotary saw and its associated saw table bracket;

FIG. 5 is a transverse cross-sectional view taken along the line 5—5 of FIG. 4 in the direction of the arrow and illustrating details of the removable saw table bracket;

FIG. 6 is a partial, front elevational view of the portable grinder support base shown with a rotary brush secured to the drive spindle for alternative use with the portable grinder;

FIG. 7 is a partial, vertical cross-sectional view similar to that of FIG. 6, but illustrating use of a saber saw attachment device together with the table saw bracket, adapting the portable grinder to alternative use as a saber saw;

FIG. 8 is a transverse cross-sectional view taken along the line 8—8 of FIG. 7 in the direction of the arrows and illustrating details of the saber saw attachment mechanism; and FIG. 9 is a transverse cross-sectional view taken along the line 9—9 of FIG. 7 in the direction of the arrows and further illustrating the mechanical details of the saber saw attachment mechanism.

Referring now in detail to the drawings, reference numeral 10 designates, generally, a portable grinder enbodying the invention, shown in closed or encased condition for storage and carrying when not in use. As illustrated, the portable grinder comprises a rectangular, shallow, box-like support base structure 11 attached to which, as by a pair of latch members 12, 13 at each end, is a complimentary, rectangular cover member 14 of substantially greater height and having a top, central carrying handle 15. As is hereinafter more particularly described, the base structure 11 houses a drawer 16 which is convenient for use in storing the various attachment devices and tools usable with the portable grinder. As further illustrated in FIG. 1, a hasp 17 affixed to the drawer end of the cover member 14 is adapted to fit cooperatively over an eye 18 secured to the front end of the drawer for locking the assembly in closed condition by a use of a pad-lock or the like (not illustrated).

As is best illustrated in FIGS. 2, 4, and 5, the support base structure 11 is fabricated of bent sheet metal, and comprises a top surface 19, longitudinal side walls 20 and 21, and a rear end wall 22. The side walls 20 and 21 terminate in inwardly-bent, marginal portions 23, 24 respectively; and the rear end wall 22 terminates in an inwardly-bent marginal portion 25. The drawer 16 is similarly of bent sheet metal, formed with a rectangular bottom wall portion 26, upstanding side wall portions 27, 28, and upstanding front and rear wall portions 29, 30. The drawer side walls 27, 28, and front and rear walls 29 and 30, terminate in inwardly-directed, marginal lip portions 31, 32, 33 and 34, respectively. It will be understood that the drawer 16 is of such size as to be slidingly receivable through the front opening of the support base structure 11.

As is best illustrated in FIGS. 2, 4, and 5, the base support structure 11 has affixed to its top surface 19, an upstanding bracket 35 carrying an elongated bearing member 36 journalling a longitudinally extending drive spindle 37. Bearing member 36 comprises end bearings 38, 39 which rotatively support the drive spindle 37. As best illustrated in FIG. 4, one end of the drive spindle 37 terminates in a reduced-diameter portion 40, and the other end thereof is threaded, as indicated at 41 in FIG. 4, to provide for the removable attachment of a variety of power driven tools, as is hereinafter more particularly described. The drive spindle 37 is retained in place within bearing member 36 by an annular shoulder 42 at one end which rests against the outside of bearing 39, and a C-clip 43 fitted within an annular groove (not illustrated) in the spindle and seated against the outside of bearing 38. The bracket 35 may conveniently be formed of sheet metal bent into triangular form, as illustrated in FIG. 5.

Means is provided for adjustably supporting an ordinary electric hand drill D so that its drive chuck C is in axial alignment with the drive spindle 37 for driving engagement with reduced-diameter portion 40 thereof. To this end, a first upstanding bracket 44 is provided, fixed to the top surface 19 of the base support structure 11, extending parallel with bearing member 36 and offset to one side. The bracket 44 may be a sheet metal bent in shallow U-shaped configuration to define a narrow, upper surface portion against which is affixed a rubber pad 45. The hand drill support means also comprises a second upstanding support bracket 46, similarly of bent sheet metal but having an inclined upper surface portion against which is affixed a rubber pad 47. The second upstanding bracket 46 is provided with a longitudinally-extending slot 48 receiving a thumb-screw for adjustable attachment to a right-angular bracket 49 fixed to the top surface 19 of support base structure 11 and so disposed that the second support bracket 46 will be arranged transversely of said base support base structure. As illustrated in FIG. 2, the first bracket 44 serves to support the handle H of electric hand drill D, and the second support bracket 46 serves to support the drill body. By adjustably positioning the second support bracket 46 by means of wing-nut 50, accommodation can be made for proper alignment of the drive chuck C with the drive spindle 37 of the portable grinder for various sizes of hand drills.

FIGS. 2 and 3 illustrate the portable grinder with grinding wheel 51 attached for use in grinding tools and other objects. The grinding wheel 51 is attached to the threaded end 41 of the drive spindle 37 by inner and outer nuts 52, 53 (only outer nut 53 illustrated in FIG. 2), and clamp washers 54, 55 (only outer clamp washer 55 illustrated in FIG. 2). An arcuate sheet metal guard 56 is removably affixed to the top wall of base support structure 11 as by bolt and wing-nut sets 57, 58 (see FIGS. 2 and 3). The sheet metal guard 56 comprises a right-angular, sheet-metal base 59 welded or otherwise affixed to which is an arcuate grinding wheel guard or hood portion 60. A right-angular bent sheet metal tool rest 61 has an inclined slot 62 by means of which it is adjustably attached to an upstanding wall portion 63 of base 59. To this end, the upstanding wall portion 63 is provided with a horizontally extending slot 64, through which and through inclined slot 62 of tool rest 61, a bolt 65 can be fitted for securing said tool rest in adjusted position by means of a suitable nut (not illustrated). As best illustrated in FIG. 2, the tool rest 61 is provided in its upper surface with a rectangular slot 66 within which the rotary grinding wheel 51 is received. It will be understood that the tool rest 61, by virtue of adjustment slots 62 and 66, is widely adjustable in position with respect to the grinding wheel 51 to accommodate a wide variety of angular positioning requirements of tools or other objects to be ground.

FIGS. 4 and 5 illustrate use of the hand drill powered portable grinder with a rotary saw 67. This alternative use is accomplished simply by removing outer nut 53 and clamp washer 55, together with grinding wheel 51, and replacing it with rotary saw 67. A rectangular, bent sheet-metal table top bracket 68 is removably attached to the top of the support base structure 11, said table top bracket having a slot 69 in its upper surface through which an upper end portion of the rotary saw 67 projects. As illustrated in FIG. 5, the table top bracket member 68 comprises front and back wall portions 70, 71 respectively, terminating in opposed, inwardly-bent portions 72, 73 respectively, each of which is provided with a pair of laterally-spaced, downwardly-extending locating pins 74, 75. The pin pairs 74, 75 are receivable in locating opening pairs 76, 77 in the top surface 19 of the support base structure 11. It will be understood that slight bending of the sides of the table top bracket 67 will be required to achieve interfitting alignment of the locating pin pairs 74, 75 in their respective pin opening pairs 76, 77, so that said table top will be frictionally attached to the support base structure 11. It will be further understood that when using the table top bracket 68 for supporting wood or the like objects for sawing, a downward force will be imposed, tending to maintain said table top bracket in fixed position with respect to the support base structure 11.

FIG. 6 illustrates alternative use of the portable grinder as stationary drive means for an ordinary rotary brush member 78. As illustrated in FIG. 6, inner and outer drive spindle nuts 52, 53 are used, together with suitable clamp washers 79, 80, to secure the rotary brush member 78 in coaxial alignment with respect to the drive spindle 37.

FIGS. 7, 8, 9, illustrate still another modification of the invention wherein a saber saw blade 81 is actuated by the electric hand drill powered drive spindle 37. To this end, a saber saw attachment mechanism 82 is provided, which serves to reciprocatively move the saber saw 81 through a slot 83 provided in the table top bracket 68, it being understood that said table top bracket will be used with the saber saw as well as with the rotary saw 67 as hereinabove described.

The saber saw attachment mechanism 82 comprises an upstanding, right-angular support bracket 84, the base 85 of which is provided with laterally-spaced, through openings for attachment with respect to the top surface 19 of support base structure 11 by the bolt and wing-nut sets 57, 58. As illustrated in FIGS. 7 and 9 the support bracket 84 is provided near its upper end with circular opening through which extends a cylindrical saw drive member 86 having an increased-diameter portion 87 defining an annular shoulder seated against the inside of said support bracket. The inner end of saber saw drive member 86 is provided with an outwardly-extending, offset pin 88 journalling one end of a drive link bar 89. The distal end of the drive link bar 89 carries a cylindrical drive pin 90 adapted to be received within a circular opening at the lower end of the saber saw 81 blade. A rectangular spacer bar 92 is affixed against the inside of the support bracket 84 as by threaded bolts 93 and 94 extending therethrough and through threaded openings in said spacer bar. The space bar 92 is provided on the inside with a rounded recess 95 allowing for free rotary movement of the saber saw drive member 86 and associated movement of drive link bar 89. The outer surface of the spacer bar 92 is provided with a vertical slot 96 within which the lower end of the saber saw blade 81 is slidingly received and which constrains said saber saw to vertical motion upon rotary motion being imparted to the saber saw drive member 86. A rectangular cover plate 97 securable against the outside of space bar 92 as by wing-nuts 98, 99 threaded on machine screws 93 and 94, retains the above described saber saw drive mechanism in assembled relation. As illustrated in FIGS. 7, 8, the lower end of the cover plate 97 is formed with an inwardly-bent portion which bears against an inner surface portion of the support bracket 84 at the lower end thereof. The cover plate 97 is also provided with a vertically-extending slot 101 providing clearance for reciprocative movement of the drive pin 90.

The outwardly projecting end of the saber saw drive member 86 is internally threaded for reception of the threaded end 41 of drive spindle 37; and opposed outer surface portions of said saber saw drive member are cut away to provide flats 102, 103 facilitating secure attachment with respect to said drive spindle by use of an open end wrench or spanner tool.

In use, it will be understood that as the saw drive member 86 rotates, its offset pin 88 will crank the drive link bar 89 to move reciprocatively in a generally vertical direction, thereby causing the saber saw blade 81 to reciprocate in the vertical direction as constrained by vertical slot 96 in spacer bar 92. As illustrated in FIG. 7, 8, 9, the height of the table top bracket 68 is such as to just cover the upper end of the saber saw attachment mechanism 82 so that the toothed portion of the saber saw will project fully through table top slot 83 during reciprocative sawing motion. It will also be understood from the foregoing that disassembly and assembly of the saber saw attachment mechanism 82 can readily be accomplished for replacing a worn saw blade whenever necessary.

An important advantage of the invention resides in the provision of a portable grinder or other rotatively driven tool which, because it lacks entirely its own electric power source supplied instead by an ordinary, inexpensive and readily available electric hand drill, provides shop tool facilities to the home owner at unusually low cost. With use of an ordinary inexpensive electric hand drill, the electric switch of the hand drill serves for turning the machine on and off.

While I have illustrated and described herein only one form in which my invention can conveniently be embodied in practice, it is to be understood that this embodiment is presented by way of example only, and not in a limiting sense. My invention, in brief, comprises all the embodiments and modifications coming within the scope and spirit of the following claims.

What I claim as new and desire to secure by Letters Patent is:

1. An electric hand drill powered tool for use with an electric hand drill having a drill body portion journalling a drive chuck at one end thereof and a hand grip portion extending sidewardly outwardly of the drill body portion, comprising, in combination, a support base structure having a flat upper surface, a drive spindle, means for journalling said drive spindle in spaced parallel relation above said flat upper surface, said drive spindle having a driven end spindle shaft portion extending outwardly of one end of said journalling means, said drive spindle having a driving end spindle shaft portion extending outwardly of other end of said journalling member, means for adjustably supporting said electric hand drill above said flat upper surface so that the chuck thereof is in rotative alignment with said drive spindle for engagement with said driven end of said spindle shaft portion, a rotatively driven tool, means for drivingly interconnecting said rotatively driven tool with said driving shaft spindle portion, said adjustable electrical hand drill supporting means comprising a first upstanding bracket fixed upon said support base structure and having an elongated upper surface portion parallel with and laterally off-set to one side of the axis of rotation of said drive spindle for supporting, from below, the hand grip portion of said electric hand drill, a second support bracket extending upwardly of said upper surface of said support base structure for supporting, from below, the body portion of said electric hand drill, the upper end of said second bracket being elongated and defining an acute angle with respect to said flat upper surface, means for adjustably securing said second bracket in the direction perpendicular to the axis of rotation of said drive spindle for accommodating hand drills having body portions of different sizes, said base support structure being of rectangular box-like structure, a cover member attachable in enclosing relation with respect to said upper surface of said support base structure, and a sliding drawer housed by said support base structure.

2. Apparatus as defined in claim 1 wherein said means for drivingly interconnecting said rotatively driven tool with said driving shaft spindle portion comprises external screw threads formed along said driving shaft spindle portion and a pair of internally-threaded nuts threadingly engaged thereon.

3. Apparatus as defined in claim 1 wherein said rotatively driven tool comprises a cylindrical grinding wheel, and an arcuate sheet metal guard removably affixed to said base support structure upper surface in partially surrounding relation with respect to said grinding wheel when said grinding wheel is drivingly interconnected with said driving shaft spindle portion.

4. Apparatus as defined in claim 1 wherein said rotatively driven tool comprises a rotary saw, and a rectangular table top bracket member removably securable upon said flat upper surface of said support base structure and having a slot for the through passage of an upper end portion of said rotary saw, the upper surface of said table top bracket member serving as a work table for feeding a work-piece to be sawn by said rotary saw.

5. Apparatus as defined in claim 1 wherein said rotatively driven tool comprises a saber saw attachment mechanism, said saber saw attachment mechanism, having a cylindrical saw drive member adapted to be driven by said driving shaft spindle portion, a saber saw blade, a pin extending outwardly of said saber saw drive member and laterally offset with the axis of rotation thereof, and a drive link bar pivotally linking said offset pin with the lower end of said saber saw blade for reciprocatively driving said saber saw blade in the vertical direction.

6. Apparatus as defined in claim 5 and further including a rectangular table top bracket member removably securable upon said flat upper surface of said support base structure and having a slot for the through passage of an upper end portion of said saber saw blade, the upper surface of said table top bracket member serving as a work table for feeding a work-piece to be sawn by said saber saw.

* * * * *